(12) United States Patent
Yaggee et al.

(10) Patent No.: US 6,222,898 B1
(45) Date of Patent: Apr. 24, 2001

(54) JACKETING PROCESS

(76) Inventors: Frank L. Yaggee, 701 E. Maple St., La Grange, IL (US) 60525-6856; Leroy R. Kelman, 920 E. Prairie Ave., Naperville, IL (US) 60540-6821; Donald W. Hackett, 112 Lafayette Cir., Kokomo, IN (US) 46901-1918

( * ) Notice: Subject to any disclaimer, the term of this patent is extended or adjusted under 35 U.S.C. 154(b) by 0 days.

(21) Appl. No.: 03/283,976

(22) Filed: Apr. 23, 1952

(51) Int. Cl.$^7$ .................................................. G21C 3/04
(52) U.S. Cl. .......................... 376/261; 376/414; 376/416; 427/6; 427/156
(58) Field of Search ............................. 22/204; 29/148 P, 29/148 SF, 188, 196.2, 197, 197.5, 198; 117/48, 5.5, 6; 427/156, 6, 5; 376/261, 414, 416

(56) References Cited

U.S. PATENT DOCUMENTS

| 158,790 | * | 1/1875 | Ferguson | 117/48 |
| 2,335,958 | * | 12/1943 | Parker | 252/29 |
| 2,588,625 | * | 3/1952 | Ferner et al. | 252/29 |

* cited by examiner

*Primary Examiner*—Harvey E. Behrend

(57) ABSTRACT

A method of jacketing a uranium slug to an aluminum container comprising applying a coating to the exterior of the container, the coating consisting of colloidal graphite in water, permitting the coating to dry, applying an alloy of aluminum and silicon to the interior surface of the container at a temperature between 588° C. and 594° C., inserting the slug into the container in complete contact with the alloy, and quenching the assembly.

7 Claims, No Drawings

JACKETING PROCESS

This invention relates to protective metallic coatings for uranium. More particularly it is concerned with the bonding of an aluminum jacket to a uranium body for protection against corrosion.

Uranium is highly reactive in oxidizing media. This fact requires that uranium be coated with a protective covering which is resistant to oxidizing agents. Accordingly, a process of bonding an aluminum jacket to a uranium body or slug has been developed to protect the uranium from corrosion during its exposure within a neutronic reactor as that disclosed in copending application Ser. No. 568,904, filed on Dec. 19, 1944 by Fermi et al (now Pat. No. 2,708,656).

Heretofore the process of inserting a cylindrical slug of uranium into a cylindrical container has required the use of an outer jacket for protecting the container from the corrosive action of the bonding agent used to bond the slug within the container. After the container is inserted into a protective jacket in a fluid-tight manner, the container is filled with a suitable bonding agent. The cylindrical slug is then inserted into the jacket, whereby the bonding agent is displaced except for the part remaining at the interface of the jacket and the slug. In addition, a cap of material similar to the container is placed over the open end of the jacket through which the slug has been inserted. The cap is there bonded in place both to the slug and the jacket. A uranium body or slug or rod is thereby created having a corrosion resistant jacket completely covering it. After completion of the bonding, the outer protective jacket, such as stainless steel, is removed.

An object of this invention is to provide a protective covering for a jacket which has an external contour of any shape and which may or may not have integral fins or ribs extending therefrom. Another object is to provide a protected jacket having greater thermal conductivity when inserting the slug in order to derive better seating and bonding characteristics. Other objects will be apparent to those skilled in the art from the following description.

This invention was conceived to overcome the expense of using an outer jacket preparatory to placement in a neutronic reactor. It has been found that the outer sleeve or jacket may be eliminated by applying a coating of graphite to the outer surface of the container prior to the bonding process. In general, before the bonding agent, which can metallurgically dissolve the container, is brought into contact with the container, a coating of graphite is applied to the exterior surface thereof and permitted to dry in a uniform, continuous layer. The container is then filled with the bonding agent at the proper temperature with care being taken to remove all gas bubbles. Immediately thereafter the uranium body or slug is inserted into the cylindrical container and a cover or cap of material similar to it is placed over the end thereof, forming a fluid-tight seal therewith. The assembly is then quenched in water which causes the graphite to flake off.

For the purpose of this invention, it is preferred that the container and cover or cap be composed of a material non-fissionable by thermal neutrons, such as aluminum. The graphite coating to be applied to the container consists of colloidal graphite in water.

When these preferred materials are used, the general method set forth above is observed within certain prescribed limits. In the first place, the coating may be applied to the exterior of the aluminum container by means of either simple immersion or spraying, the latter being preferred where the container has external radial fins in order to assure complete coverage of the corners or crevices with the coating. It was found that the coatings could be dried expediently by means of a brief exposure to a radiant lamp prior to coating. This method produced a uniform graphite coating free from cracks where the graphite applied consists of colloidal graphite in water. In the alternative, a commercial product, commonly know as Alrok, may be used. Alrok is composed of sodium carbonate and dichromate solution. The bonding agent is preferably an alloy of aluminum and silicon, having a melting point between 577° and 584° C. However, where the coating comprises a sodium carbonate and dichromate solution, a chemical reaction occurred with the exterior surface of the aluminum container causing the formation of an oxide thereon. Such coating proved to be permanent and could not be removed upon quenching as is possible in the case of graphite. In either case, the graphite and oxide proved to be resistant to the corrosive characteristics of the bonding alloy of aluminum and silicon.

It has been found that the aluminum-silicon alloy must be maintained within the temperature limits of 588°–594° C. A lower temperature caused the alloy to begin to solidify, and the higher temperature caused the alloy to attack the aluminum container in an accelerated manner. Because the reaction of the alloy with the container is a function of temperature the time interim from the moment the aluminum-silicon alloy is placed in the container until the assembly is quenched in water, should be no greater than 30–40 seconds. A longer time has proven sufficient to permit the bonding agent to corrode completely through the aluminum container. Accordingly, as soon as the uranium is inserted into the container and the aluminum cap attached thereto, the assembly is quenched in water, causing the aluminum-silicon alloy to solidify into a uniform bond over the entire interface of the container and body. Of course, solidification of the alloy terminates its reaction with the aluminum container.

Where graphite coating is used as distinguished from the oxide coating, the quench causes the graphite to flake off, because the coefficient of expansion of aluminum is greater than that of graphite. It is apparent, however, that inasmuch as the oxide coating is chemical in nature, it will not be removed by the water quench for which reason the graphite coating is preferred.

Other variations from the preferred methods will be apparent and may be made without departing from the spirit and scope of the invention.

What is claimed is:

1. A method for treating a surface of a metal body comprising applying a graphite coating to the surface to be protected, and applying a material reactive with the metal body on the uncoated surface.

2. A method for treating a surface of aluminum comprising applying a graphite coat to one surface of an aluminum body, and applying a material reactive to aluminum on the uncoated surface.

3. A method for protecting the exterior of an aluminum container during boding to a uranium slug comprising applying a graphite coat to the exterior surface of the container, and applying a bonding agent reactive to aluminum, to the interior surface of the container and the slug.

4. A method for protecting the exterior of an aluminum container during immersion in an aluminum-silicon alloy comprising applying a coating comprising colloidal graphite in water to the exterior surface of the container, and applying an alloy containing aluminum and silicon to the interior surface of the container.

5. A method for protecting the exterior of an aluminum container during immersion in an aluminum-silicon alloy comprising applying a coating to the external surface of the container, the coating comprising colloidal graphite in water, permitting the coating to dry, and applying an alloy of aluminum and silicon to the interior surface of the container at a temperature between 588° and 594° C.

6. A method of jacketing a uranium slug to an aluminum container comprising applying a coating to the exterior of the container, the coating consisting of colloidal graphite in water, permitting the coating to dry, applying an alloy of aluminum and silicon to the interior surface of the container at a temperature between 588° and 594° C., inserting the slug into the container in complete contact with the alloy, and quenching the assembly.

7. A method of jacketing a uranium slug to an aluminum container comprising applying a coating to the exterior of the container, the coating consisting of colloidal graphite in water, permitting the coating to dry, applying an alloy of aluminum and silicon to the interior surface of the container at a temperature between 588° and 594° C., inserting the slug into the container in complete contact with the alloy, and quenching the assembly, the time interval between applying the alloy and the quenching being a maximum of forty seconds.

* * * * *